US008474503B2

(12) United States Patent
Kirk et al.

(10) Patent No.: US 8,474,503 B2
(45) Date of Patent: Jul. 2, 2013

(54) SYSTEMS AND METHODS FOR SEALING THE TRAILING EDGE OF A PRINTED ARTICLE

(75) Inventors: Harry V. Kirk, Acworth, GA (US); David Henson, Cartersville, GA (US); Bryan Carbon, Woodstock, GA (US); Tony Key, Canton, GA (US); Michael Aiken, Canton, GA (US); Robert H. Mills, Kennesaw, GA (US); Thomas J. Greulich, Woodstock, GA (US)

(73) Assignee: Kirk-Rudy, Inc., Woodstock, GA (US)

( * ) Notice: Subject to any disclaimer, the term of this patent is extended or adjusted under 35 U.S.C. 154(b) by 200 days.

(21) Appl. No.: 12/878,447

(22) Filed: Sep. 9, 2010

(65) Prior Publication Data

US 2012/0060998 A1 Mar. 15, 2012

(51) Int. Cl.

| | |
|---|---|
| ***B32B 37/02*** | (2006.01) |
| ***B32B 38/00*** | (2006.01) |
| ***F16H 53/00*** | (2006.01) |

(52) U.S. Cl.

USPC .................. 156/441.5; 156/442.1; 156/442.4; 156/581; 156/582; 156/491

(58) Field of Classification Search

USPC .................. 156/64, 441.5, 442.1, 442.4, 581, 156/582, 491

See application file for complete search history.

(56) References Cited

U.S. PATENT DOCUMENTS

| | | | | | |
|---|---|---|---|---|---|
| 4,004,962 | A | | 1/1977 | Kleid | |
| 4,160,687 | A | * | 7/1979 | Spear | 156/444 |
| 4,889,461 | A | | 12/1989 | Kampen et al. | |
| 5,207,858 | A | * | 5/1993 | DeBarber et al. | 156/441.5 |
| 5,632,476 | A | | 5/1997 | Stauber | |
| 5,635,017 | A | | 6/1997 | Morrow | |
| 7,611,135 | B2 | | 11/2009 | Kaya | |

* cited by examiner

*Primary Examiner* — George Koch

(74) *Attorney, Agent, or Firm* — Troutman Sanders LLP; Robert R. Elliott, Jr.

(57) ABSTRACT

A kicker wheel for folding and sealing the trailing edge of a folded article with sealing tabs. The kicker wheel can include a thin product support rail to support the article during activation of an air nozzle. The kicker wheel can also include a profiled tab swipe to fold and seal one or more tabs on the trailing edge of the article. The kicker wheel can be substantially cylindrical or can have an arcuate portion and a counterweight portion. One or more kicker wheels can be used in conjunction with an improved tabbing machine. The tabbing machine can include one or more air jets that along with the kicker wheel enable tabs to be applied to multiple sides of the article without turning or flipping the article.

15 Claims, 11 Drawing Sheets

R

SYSTEMS AND METHODS FOR SEALING THE TRAILING EDGE OF A PRINTED ARTICLE

BACKGROUND OF THE INVENTION

1. Field of the Invention

The present invention relates generally to a system and method for sealing the trailing edge of folded articles, and particularly to a system and method for sealing the trailing edge of folded articles with one or more sealing tabs or stickers to facilitate mailing.

2. Background of Related Art

The United States Postal Service ("USPS") establishes requirements for articles that are sent through the mail. These requirements ensure that articles of mail received by the USPS can be, for example, sorted in automatic machines without causing jams or other malfunctions. These requirements also ensure that mailed articles can be easily packed, carried, and delivered by postal workers.

Many articles, such as folded self mailers and booklets, are required to be sealed to prevent them from opening and, for example, becoming caught in the aforementioned sorting machines. This is often done by placing a small sticker, or tab, to the edge of the article and folding it over to seal open edges. Conventionally, a tabbing machine is used to apply tabs to folded self mailers. The tabs are then folded and sealed using either a side apply and fold or a leading edge apply and fold method (or "crash" method). The side apply uses a shaped rail to bend the tab over and adhere it to opposite side of the article. A leading edge apply generally blows down a tab on the leading edge of the article as the article passes over a slot in the table of the machine. As the article moves forward, the tab "crashes" into the trailing edge of the slot folding the tab under and adhering it to the article.

The edge fold and crash techniques (or, "conventional techniques") work well enough for sealing tabs located on the sides and/or leading edge of the article. Recent changes to USPS regulations, however, specify that folded articles must be sealed on up to three open sides (i.e., the fourth side being the fold). See, 39 C.F.R. §111 as amended Sep. 8, 2009. This requires the article to be sealed on the trailing edge.

Using conventional edge fold and crash techniques under this new regime requires the used of multiple tabbing machines. This is because conventional tabbers are unable to seal the trailing edge of an article as it passes through the machine. For example, two tabbing machines using side apply and fold can be used to place tabs on opposite sides as needed based on product flow. Sealing all three sides of the article, however, requires up to three tabbers (e.g., the Kirk Rudy Model # KR535 or KR435) and a product-turning machine (e.g., the Kirk Rudy Model # KR730).

The article passes through the first tabber and is tabbed on one side. The article then passes through a turner that rotates the article 90 degrees (e.g., turning the tabbed edge to the leading edge or the trailing edge). A second tabber can then apply tabs to one of the (now) edges. A third tabber can then apply tabs to the opposite edge. This arrangement avoids a machine from tabbing a trailing edge. Using conventional technology, therefore, the new USPS regulations require two, three, or four machines to be purchased, operated, and maintained to achieve an acceptable product. This represents a significant expense and requires additional floor space on the production floor. A single tabbing machine such as the Kirk-Rudy Model # KR535, for example, costs approximately $20,000. In addition, two, three, or four machines must be recalibrated each time a new product is introduced with a different material, thickness, or size.

What is needed, therefore, is a device that enables tabs to be placed on the trailing edge of a product. The device should be compatible for use with existing technologies to enable an article to be tabbed on three sides without turning or flipping the article. The device should enable an article to be tabbed on at least three sides using a single machine in substantially less space than is occupied by the two, three, or four conventional machines currently required. It is to such a device that embodiments of the present invention are directed.

BRIEF SUMMARY OF THE INVENTION

Embodiments of the present invention relate generally to a system and method for sealing the trailing edge of folded articles, and particularly to a system and method for sealing the trailing edge of printed articles with one or more sealing tabs or stickers.

Embodiments of the present invention can comprise a kicker wheel. The kicker wheel can comprise a thin product support rail, a profiled tab swipe, one or more kicker rails, and a counterweight to balance the kicker about an axis, preferably a central axis. The thin product support rail can be disposed on the leading edge of the kicker wheel and can support the edge of the article. The profiled tab swipe can have a bump, or protrusion, that lies outside the path of rotation for the rest of the kicker wheel. In this manner, the kicker wheel can move the article upward during part of its rotation. The kicker rails can be disposed on the sides of the kicker wheel and can support the edges of the article as it passes over the kicker wheel. In some embodiments, the profiled tab swipe and the thin product support rail can define a valley in the kicker wheel.

The kicker wheel can further comprise an axle hole enabling it to be mounted on an axle. In some embodiments, the kicker wheel can be keyed or press fit on the axle. In some embodiments, the kicker wheel can be weight balance about the axle, though this is not strictly necessary and other configurations are contemplated. The kicker wheel can be manufactured using, for example and not limitation, CNC machining, casting, or various molding techniques. The kicker wheel can comprise many materials, including but not limited to, aluminum, steel, pot metal, plastic, fiberglass, and carbon fiber.

In some embodiments, the kicker wheel can be used in conjunction with a tabbing machine and can enable the article to be sealed on all four sides, if desired. The tabbing machine can comprise one or more drive belts for moving the article across a table. In some embodiments, the table can have an opening, or window, enabling the kicker wheels access to the article as it passes over the kicker wheel. One or more kicker wheels can be mounted below the window, depending on the number of trailing edge tabs to be applied. The kicker wheel can be mounted such that the thin product support rail and the kicker rails are substantially even with the table, while the protrusion on the profiled tab swipe is slightly above the table.

The tabbing machine can further comprise a spring-loaded brake arm equipped with a brake pad. The brake pad can comprise a high friction material such as, for example and not limitation, natural rubber, synthetic rubber, or urethane. The brake arm can be adjusted such that the brake pad does not touch the article unless the profiled tab swipe on the kicker wheel is adjacent the brake pad. In this position, the brake pad can create sufficient friction to stop the article briefly, while the drive belts slip over the article.

The tabbing machine can further comprise one or more air nozzles to blow the tab down into the valley of the kicker wheel as the article passes. The tabbing machine can utilize a sensor to detect when the article enters the window. The sensor can be, for example and not limitation, a light sensor, a proximity sensor, or a laser. The sensor can be used to time, for example, the air nozzle blasts and the rotation of the kicker wheel.

The kicker wheel can be driven, directly or indirectly, by a servomotor. In some embodiments, the servomotor can drive the kicker wheel via a belt. The belt can comprise, for example and not limitation, a v-belt, a serpentine belt, or a toothed belt. The servomotor can be, for example and not limitation, an electric, air, or hydraulic motor capable of quickly accelerating the kicker wheel and turning it precisely through one rotation. In use, the kicker wheel can be rotated at a higher speed than the translational speed of the drive belts. In a preferred embodiment, the kicker wheel is rotated at approximately three times the speed of the drive belts.

Embodiments of the present invention can also comprise a method for sealing the trailing edge of an article. The article can be moved across the table by the drive belts. As the article approaches the window in the table, the sensor can detect the presence of the article. The sensor can then trigger the kicker wheel to rotate one revolution and the air nozzle(s) to provide a blast of air. The rotation of the kicker wheel can be timed such that the trailing edge of the article is aligned with the thin product support rail at the same time the air nozzles are triggered. The air nozzles can blow the tab down into the valley of the kicker wheel, while the thin product support rail prevents the article from bending.

In some embodiments, the kicker wheel can continue to rotate until the leading edge of the profiled tab swipe crashes into the tab. This can fold the tab under the article. The kicker wheel can then continue to rotate such that the protrusion on the profiled tab swipe traps the article between the kicker wheel and the brake pad. In the position, the article is temporarily stopped and the protrusion can fold the tab flat against the bottom of the article and press it firmly for proper adhesion. The kicker wheel can then return to its starting position, having made one revolution, and the article is released and can continue down the table for collating, additional processing, etc.

In some embodiments, the kicker wheel can be used in conjunction with traditional methods, such as crashing and side apply methods, to apply tabs to two, three, or four sides of an article. In other embodiments, multiple kicker wheels and multiple crash and side apply rails can be used to apply multiple tabs to each side of the article. These and other objects, features and advantages of the present invention will become more apparent upon reading the following specification in conjunction with the accompanying drawing figures.

DETAILED DESCRIPTION OF THE INVENTION

Figure 1:
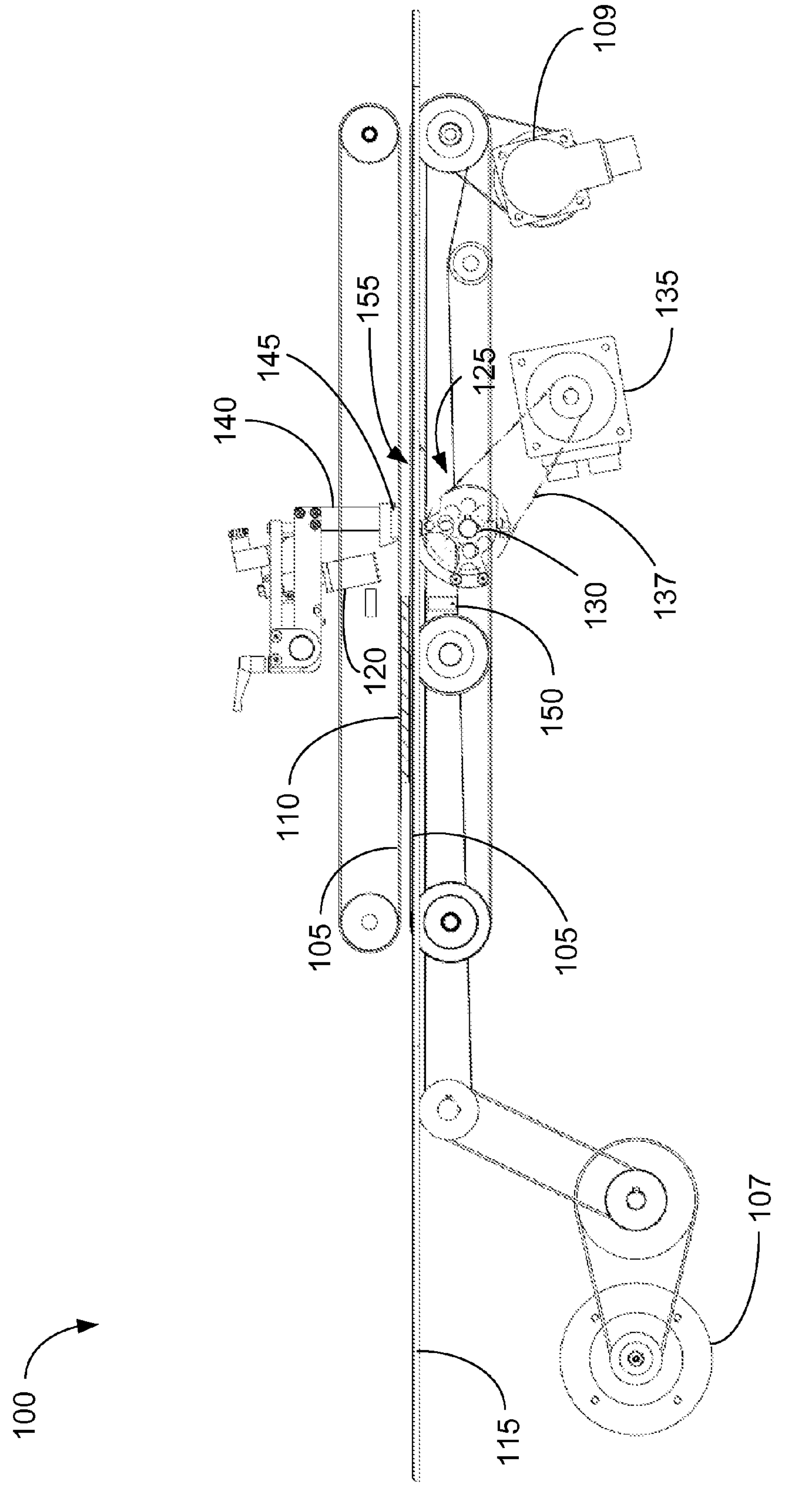
FIG. 1 illustrates a side view of a tabbing machine, in accordance with some embodiments of the present invention.

Embodiments of the present invention relate generally to a device, system, and method for sealing the trailing edge of folded articles, and particularly to a device, system, and method for sealing the trailing edge of printed articles with one or more sealing tabs or stickers. The system can comprise, among other things, a kicker wheel and a brake arm equipped with a brake pad. The system can enable articles to be sealed on the trailing edge without the need to turn or flip the article. This reduces capital investment and speeds production. The system can be added to a conventional tabbing machine or can be implemented in stand-alone equipment.

To simplify and clarify explanation, the system is described below as a system for use with folded paper articles ("articles"). One skilled in the art will recognize, however, that the invention is not so limited. The system can be deployed to seal the edges for various substantially flat, flexible articles such as, for example and not limitation, envelopes, magazines, catalogs, and mailers. The system is also described for use to meet various USPS mailing regulations, but can also be used anytime folded articles need to be sealed to facilitate, for example and not limitation, machine sorting, printing, or labeling.

The materials described hereinafter as making up the various elements of the present invention are intended to be illustrative and not restrictive. Many suitable materials that would perform the same or a similar function as the materials described herein are intended to be embraced within the scope of the invention. Such other materials not described herein can include, but are not limited to, materials that are developed after the time of the development of the invention. The dimensions listed in the various drawings are for illustrative purposes only and are not intended to be limiting. Other dimensions and proportions are contemplated and intended to be included within the scope of the invention.

As described above, a problem with conventional tabbing machines is that they are unable to apply a tab to the trailing edge of article using conventional techniques. Many conventional tabbing machines are capable of applying tabs to at most three sides (i.e., the leading edge and the two sides). As a result, in the past, it has been necessary to turn or flip the article in some manner to apply additional tabs. In other words, by rotating the article 90 degrees, the once trailing edge now becomes the side edge, facilitating tabbing.

Conventionally, an article passes through a tabbing machine and has tabs applied to, for example, one side. The article then passes through a turning machine and is turned so that the former trailing edge of the article is now the side edge. The article then passes through a second tabbing machine to seal a second edge. The article then passes through a third tabbing machine to seal the third edge (opposite the second edge). These four machines (i.e., tabber #1, turning machine, tabber #2, and tabber #3) represent a significant capital investment. A tabbing machine, for example, such as the Kirk-Rudy KR535 can cost as much as approximately $20,000.

What is needed, therefore, is a machine that can seal multiple sides of an article, including the trailing edge, in a single pass and with a single machine. It is to such a machine that embodiments of the present invention are primarily directed.

As shown in FIG. 1, embodiments of the present invention can comprise an improved tabbing machine, or tabber 100, for sealing a folded article 110. The tabber 100 can comprise one or more drive belts 105 for moving the article 110 along the table 115 of the tabber 100. The drive belts 105 can be driven, directly or indirectly, by a drive motor 107. In some embodiments, a shaft encoder 109 can be used to track the speed and position of the conveyor or drive belts 105. The drive belts 105 can comprise a material that provides sufficient grip on an article 110 for efficient transport, yet can provide slip when necessary. The drive belts 105 can comprise, for example and not limitation, natural or synthetic rubber, nylon, or polyester. In a preferred embodiment, the drive belts 105 can comprise Acrylonitrile-Butadiene-Rubber.

Figure 2:
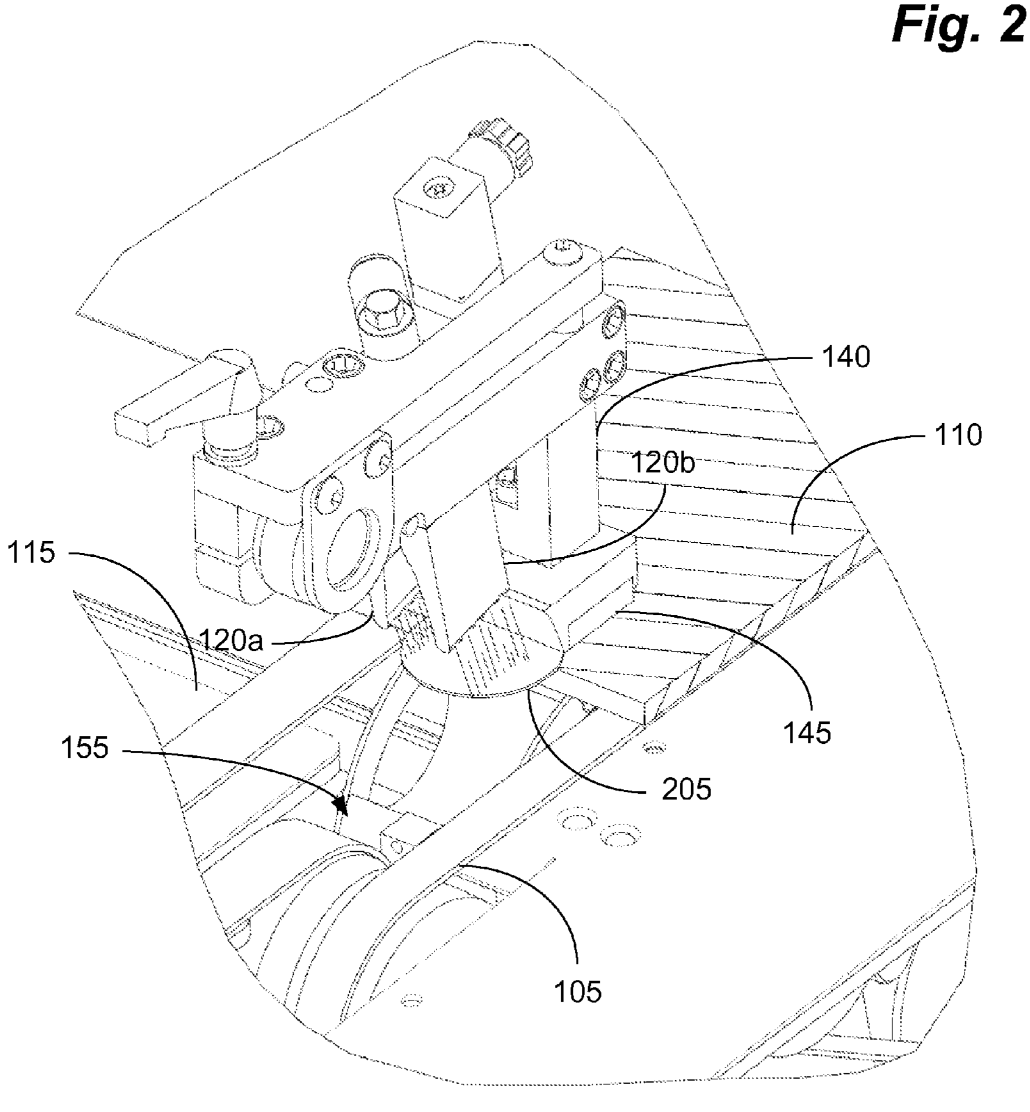
FIG. 2 illustrates a perspective, detailed view of a tabbing machine, in accordance with some embodiments of the present invention.

The tabber 100 can further comprise one or more air nozzles 120. The air nozzles 120 can be used to blow down a tab on the trailing edge of the article 110 as the article passes. As shown in FIG. 2, in some embodiments, it can be desirable to use multiple air nozzles 120*a*, 120*b*. As the tab 205 passes under the air nozzles 120*a*, 120*b* a brief blast of air is used to bend the edge of the tab 205 downward. If a single nozzle 120 is used, aimed at the middle of the tab 205 for example, the tab 205 tends to bend in the middle, or "cup." This can make the tab 205 rigid and can prevent it from folding about the trailing edge of the article 110 in the desired manner. Thus, while a single nozzle 120 may be suitable for particularly small or narrow tabs 205, two nozzles 120*a*, 120*b* help to prevent cupping on larger (e.g., 1.5"diameter) tabs and enable the tab 205 to fold down uniformly along a line even with the trailing edge of the article 110. In some embodiments, such as with a particularly wide tab 205, it may be desirable to use three or more nozzles 120, as necessary.

Referring back to FIG. 1, the tabber 100 can also include a kicker wheel 125. The kicker wheel 125 can be positioned with its axis of rotation below the table 115 and can be mounted on an axle 130. The kicker wheel 125 can be positioned in an opening, or window 155 in the table 115. The kicker wheel 125 can be driven, either directly or indirectly, with a servomotor 135. In some embodiments, the kicker wheel 125 can be driven indirectly by the servomotor 135 using a drive belt 137. The drive belt 137 can comprise, for example and not limitation, a v-belt, a cog belt, or a serpentine belt. The drive belt 137 can comprise, for example and not limitation, natural or synthetic rubber, nylon, or polyester. In a preferred embodiment, the drive belt 137 can comprise a toothed Rubber Reinforced; Fiberglass High Torque Timing Belt.

The tabber 100 can further comprise a brake arm 140 with a brake pad 145. The brake arm 140 can be disposed such that the brake pad 145 is positioned slightly above the article 110 as it crosses the table 115. In other words, the brake pad 145 does not touch the article 110 unless the article 110 is lifted slightly off the table 115. In some embodiments, the brake arm 140 can be spring-loaded such that it provides resistance to being displaced in an upward direction. The brake arm 140 can be adjustable to adjust the position of the brake pad 145 relative to the table 115. This can be useful to adapt the tabber 100 for articles 110 of different thicknesses. The brake pad 145 can comprise, for example and not limitation, rubber, plastic, or nylon. In a preferred embodiment, the brake pad 145 can comprise Nitrile Butadiene Rubber.

The tabber 100 can further comprise an article sensor 150. The sensor 150 can be used to detect when the article 110 is entering the window 155 in the table 115. The sensor 150 can be for example and not limitation, a proximity switch, a light sensor, or a laser. In a preferred embodiment, the sensor 150 is a Self-contained Photoelectric Sensor. The sensor 150 is used, in conjunction with the shaft encoder 109, to properly time the operation of the servomotor 135 and thus, the kicker wheel 125.

Figure 3A:
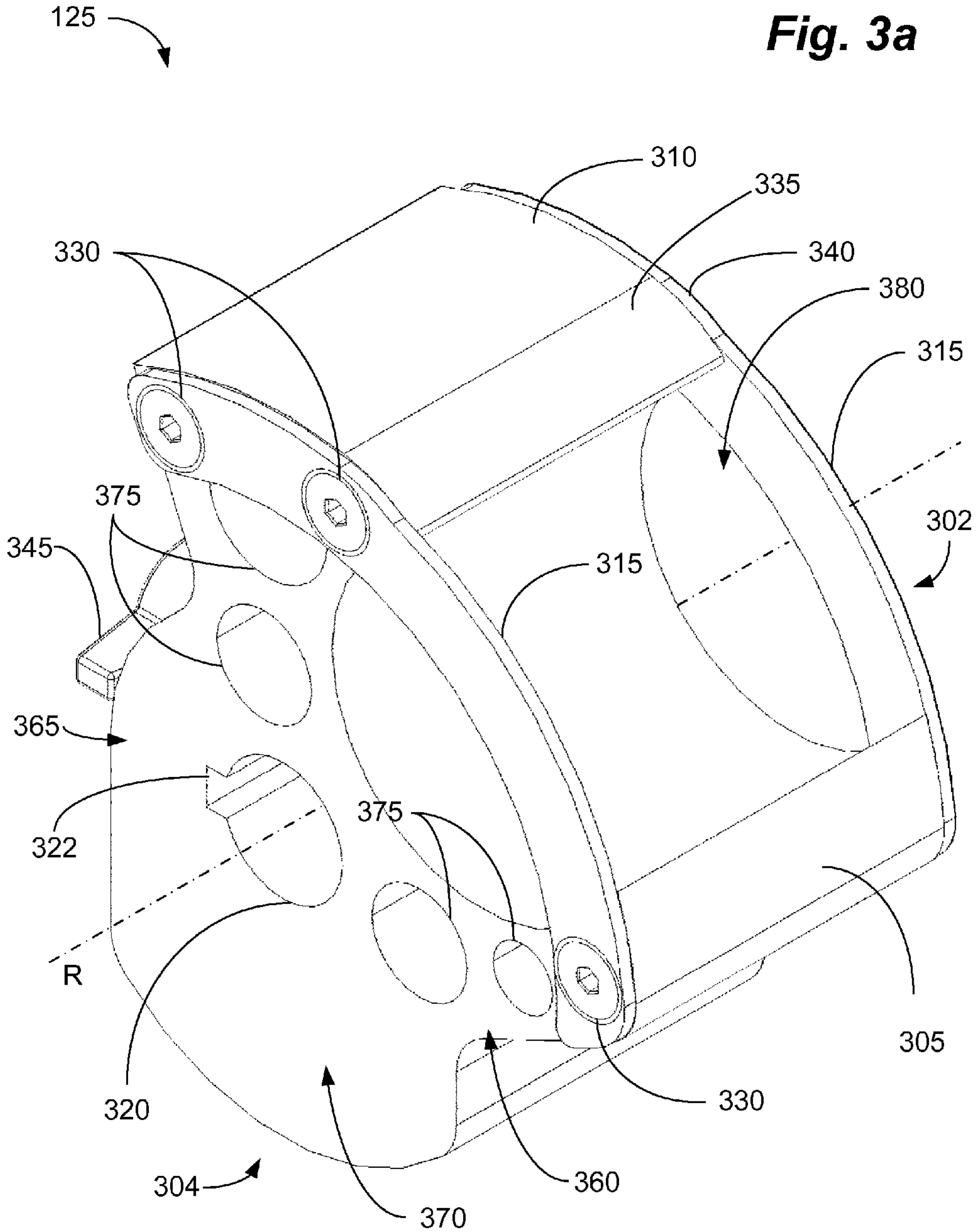
FIG. 3*a* illustrates a front, perspective view of a kicker wheel, in accordance with some embodiments of the present invention.
Figure 3B:
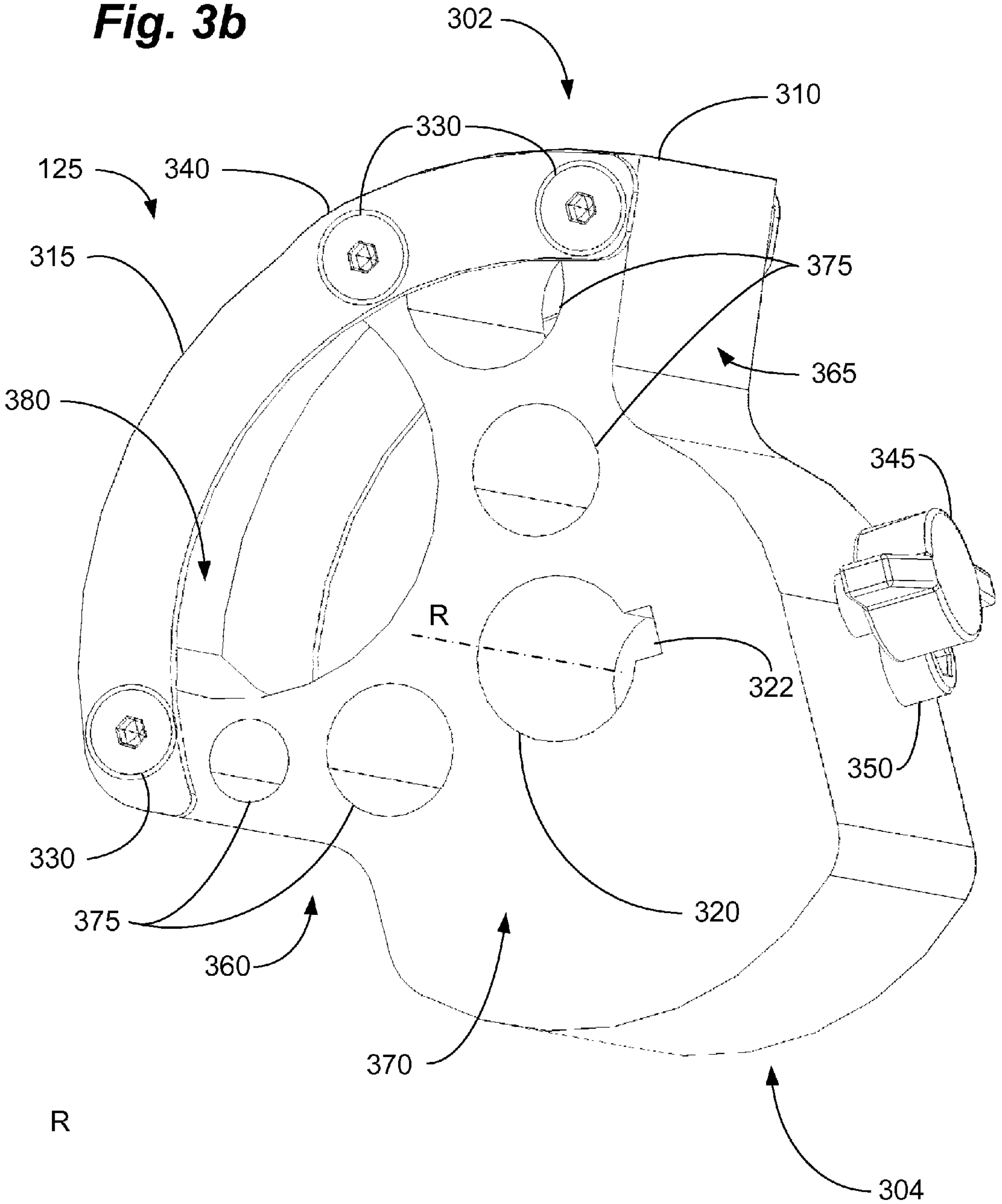
FIG. 3*b* illustrates a rear, perspective view of a kicker wheel, in accordance with some embodiments of the present invention.
Figure 3C:
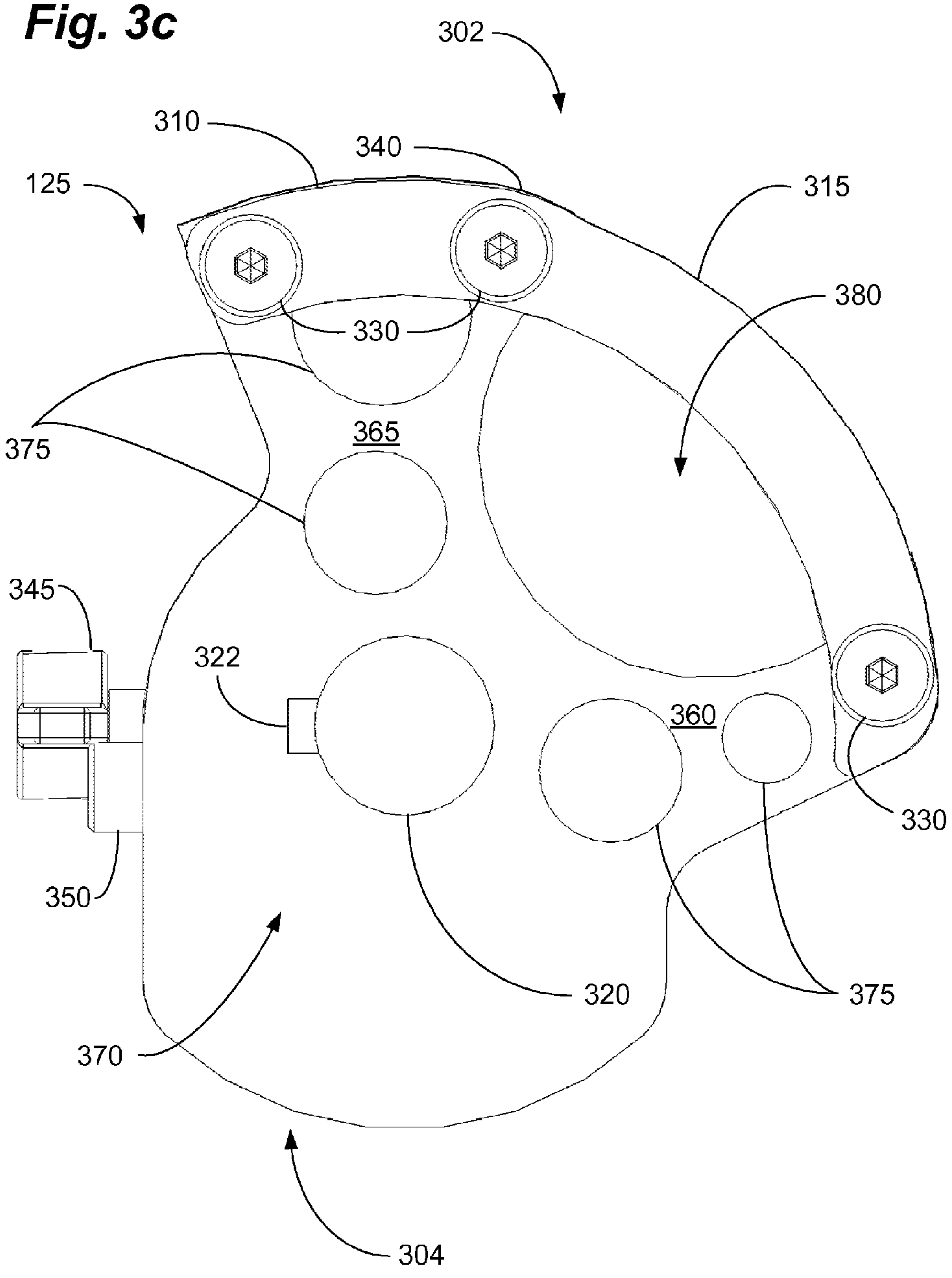
FIG. 3*c* illustrates a side view of a kicker wheel, in accordance with some embodiments of the present invention.

As shown in FIGS. 3*a*-3*c*, embodiments of the present invention can comprise a kicker wheel, or kicker wheel 125. The kicker wheel 125 can comprise a counterweight 304, a thin product support rail 305, one or more kicker rails 315, and a profiled tab swipe 310. In some embodiments, the kicker wheel 125 can be substantially cylindrical. In other embodiments, the kicker wheel 125 can have a curved portion 302 and a counterweight 304. As is discussed further below, this configuration enables the kicker wheel 125 to be spaced apart from the article when it is rotated away from the article 110. As shown, the kicker wheel 125 is rotated clockwise, though the direction of rotation can be changed by simply reversing the kicker wheel 125.

In some embodiments, the counterweight 304 can be sized and shaped such that the mass of the kicker wheel 125 is balance about a central axis of rotation R. This configuration tends to reduce component wear caused by forces and vibrations due to the imbalance. Due to its relatively small size, however, it is not strictly necessary that the kicker wheel 125 be balanced about the axis of rotation R. The kicker wheel 125 can be manufactured using a variety of methods, including but not limited to, molded, cast, or machined from billet. The kicker wheel 125 can comprise, for example and not limitation, metal, plastic, or other suitably rigid material. In a preferred embodiment, the kicker wheel 125 can be CNC machined from Nylatron.

In some embodiments, the kicker wheel 125 can comprise a thin product support rail 305. The thin product support rail 305 can span substantially the entire width of the kicker wheel 125. In use, the kicker wheel 125 can be rotated such that the thin product support rail 305 is positioned under the article 110 to support the article 110 across its width. The thin product support rail 305 supports the article 110 to prevent it from bending downward when the air nozzle(s) 120 are activated.

The kicker wheel 125 can further comprise a profiled tab swipe 310. The profiled tab swipe 310 can span substantially the entire width of the kicker wheel 125 and can be disposed opposite the thin product support rail 305. The profiled tab swipe 310 can further comprise a hump, or projection 335. The projection 335 and the matching profile 340 on the kicker rails 315 can be slightly above the profile of the kicker wheel 125. In other words, when the kicker wheel 125 is rotated, the path of rotation for the projection 335 is slightly outside that of the remainder of the kicker wheel 125. This enables the kicker wheel 125 to lift the article 110 up slightly pressing it against the brake pad 145 promoting proper adhesion of the tab 205.

In some embodiments, the thin product support rail 305 and the profiled tab swipe 310 can define extensions, or arms 360, 365, projecting out from the main body 370 of the kicker wheel 125 and defining a valley 380 thereon. In other embodiments, the thin product support rail 305 and the profiled tab swipe 310 may be separate pieces bolted, or otherwise affixed, to the main body 370 of the kicker. In some embodiments, the arms 360, 365 can further define one or more holes 375. The holes 375 can be used, among other things, to lighten and/or balance the kicker wheel 125. Lightening the kicker wheel 125 reduces its rotational inertia enabling it to be rotated more easily. This, in turn, can reduce wear on, among other things, the axle 130 and servomotor 135 and can enable the kicker wheel 125 to be accelerated more quickly.

The kicker wheel 125 can further comprise one or more kicker rails 315. The kicker rails 315 can be disposed on either side of the kicker wheel 125 and are configured to support the edges of the article 110 as it passes over the window 155. The kicker rails 315 can be integral to the kicker wheel 125 or can be attached thereto. The kicker rails 315 can be, for example, and not limitation, bolted, screwed, glued, or welded to the kicker wheel 125. In a preferred embodiment, the kicker rails 315 can be affixed to the kicker wheel 125 using one or more bolts 330.

As shown in FIG. 3*b*, the kicker wheel 125 can further define an axle hole 320 used to mount the kicker to the axle 130. In some embodiments, the axle hole 320 can be, for example, press fit or pinned onto the axle 130. In some embodiments, the axle hole 320 can further define a keyway 322 sized and shaped to correspond to a key (e.g., a square key) on the axle 130. The keyway 322 can be useful to align and maintain the position of the kicker wheel 125 and to prevent the kicker wheel 125 from spinning on the axle 130.

The kicker wheel 125 can further comprise a set screw 345. The set screw 345 can be threadably engaged with the kicker wheel 125 such that it is substantially perpendicular to the axle hole 320. In a preferred embodiment, the set screw 345 can be disposed on the counterweight 304, though this location is not critical and other configurations are contemplated (e.g., in the valley 380). In a first position, the shaft of the set screw 345 can be unscrewed such that it is retracted from the axle hole 320. The can enable the kicker wheel 125 can be repositioned on, or removed from, the axle 130. In a second position, the set screw 345 can be screwed in such that the shaft of the set screw 345 protrudes into the axle hole 320. In this position, the kicker wheel 125 can be frictionally engaged with the axle 130, substantially preventing movement.

In some embodiments, the kicker wheel 125 can further comprise a set screw stop 350. The set screw stop 350 can be threadably engaged with the counterweight 304 and disposed such that it interferes with the operation of the set screw 345. In other words, with the set screw stop 350 in place, the set screw 345 can only be partially loosened. So, for example, this may enable the kicker wheel 125 to be repositioned on the axle 130, but not removed from it. The set screw stop 350 can also prevent the set screw from vibrating out of the kicker wheel 125 if it is inadvertently left loose. If the kicker wheel 125 needs to be removed from the axle 130, for example, the set screw stop 350 can be removed first and then the set screw 345.

Figure 4A:
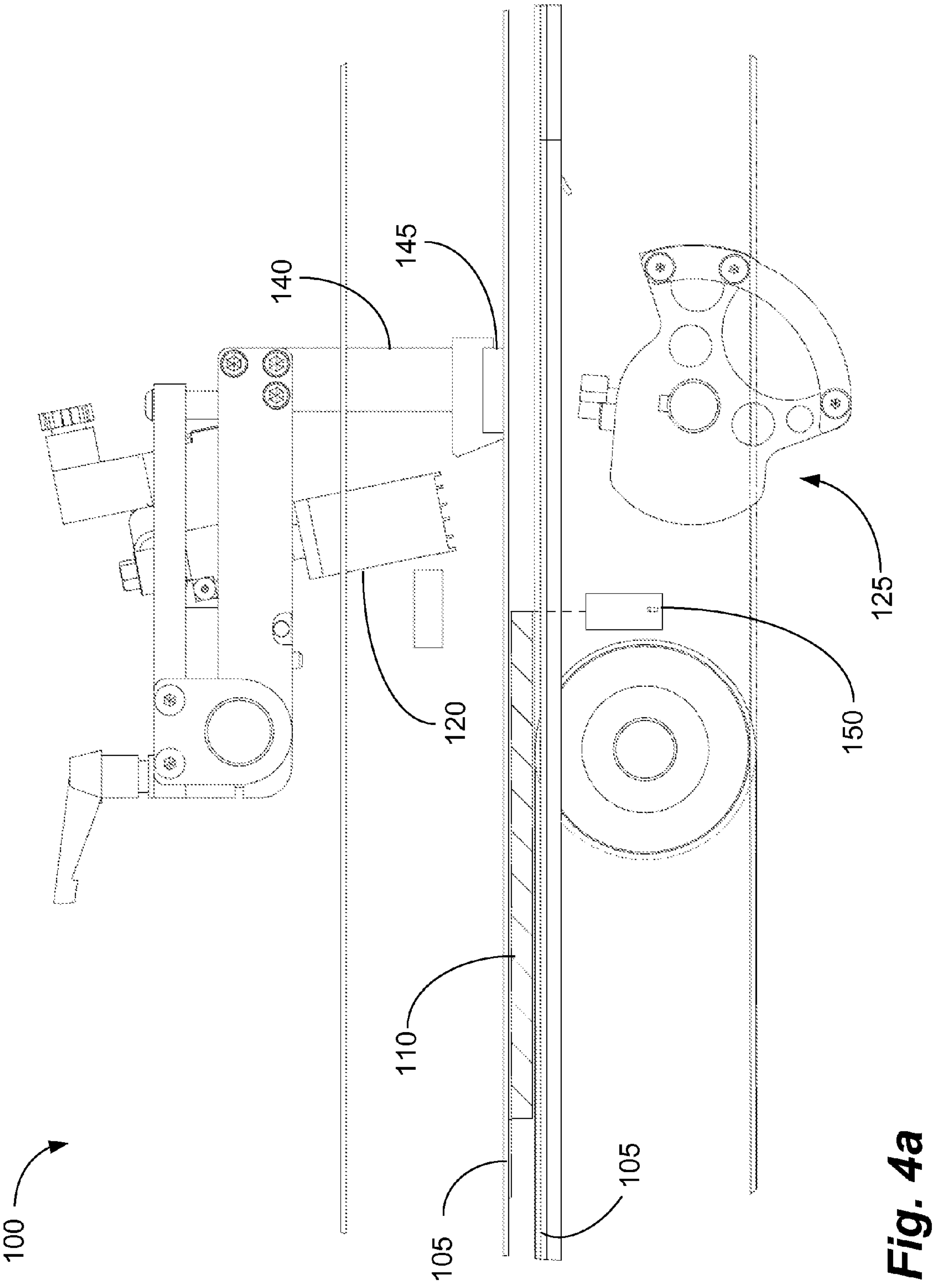
FIGS. 4*a*-4*f* illustrate a side view of a tabbing machine in use, in accordance with some embodiments of the present invention.

FIGS. 4*a*-4*f* depict the process of sealing the trailing edge of an article 110 as it passes the through the tabber 100, in accordance with some embodiments of the present invention. FIG. 4*a* depicts the article being pulled along the table 115 by the drive belts 105. The kicker wheel 125 is shown in the rest, or park position. In the park position, the shape of the kicker wheel 125 can enable it to sit clear of the table 115 and drive belts 105 reducing the chances of the jams or other malfunctions.

As the article 110 passes the sensor 150, the kicker servomotor 135 can be activated to start rotating the kicker wheel 125. In some embodiments, the kicker servomotor 135 is activated when the leading edge of the article 110 breaks the sensor 150 beam. The kicker wheel 125 is preferably accelerated up to a higher speed than the translational speed of the belts 105. The kicker can be rotated, for example, at a speed of between 1.5 and ten times the speed of the belts 105. In a preferred embodiment, the kicker wheel is rotated at approximately three times the speed of the belts 105. In this manner, the kicker wheel 125 can act upon the article 110, while only stopping the article 110 momentarily.

Figure 4B:
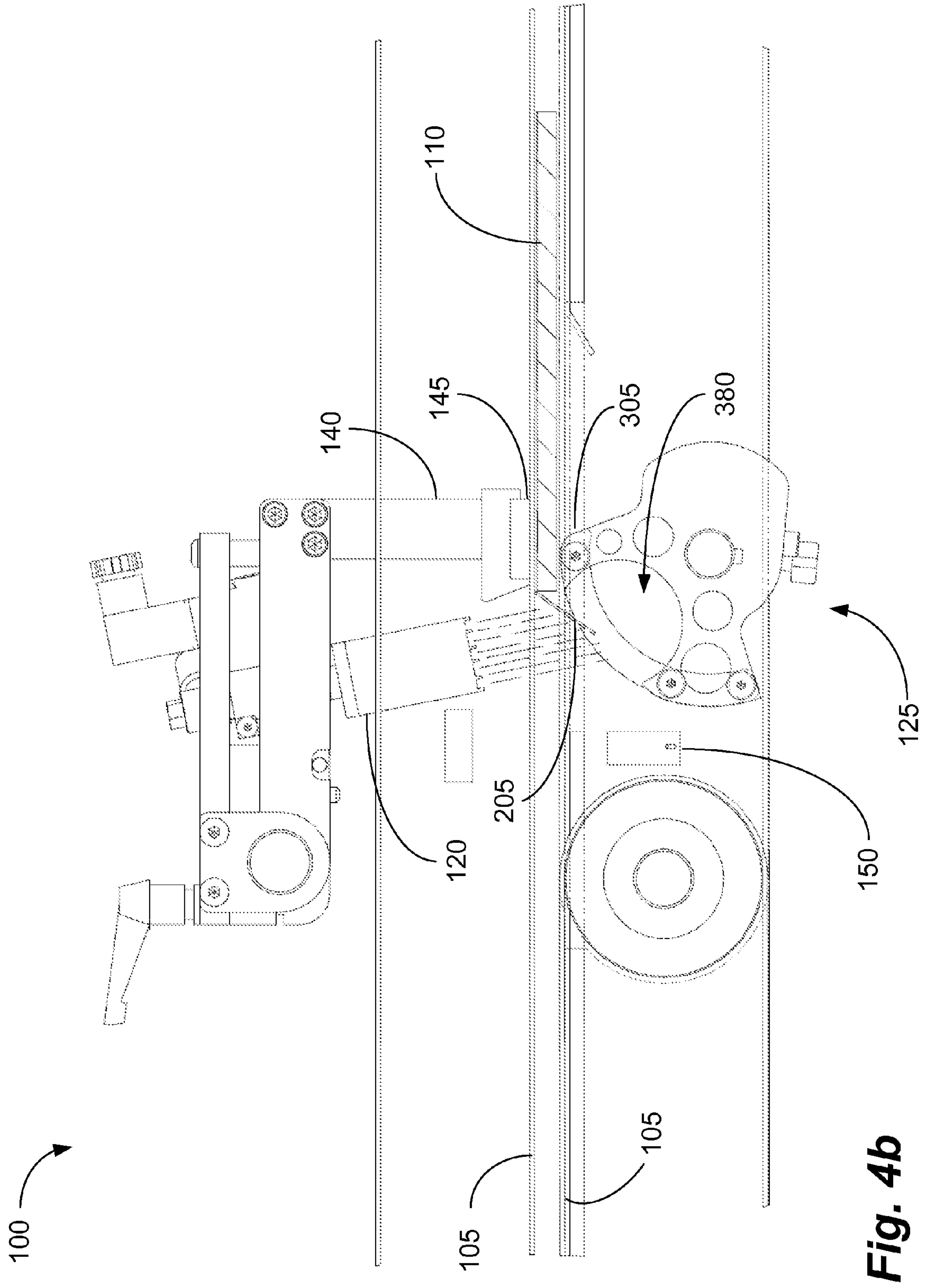

In FIG. 4*b*, the kicker wheel 125 has rotated approximately 270 degrees and has been accelerated to full speed (e.g., three times the belt 105 speed). The rotation of the kicker wheel 125 is preferably timed such that the thin product support rail 305 aligns with the trailing edge of the article 110 at the same time the air nozzles 120 are activated. This can enable the tab 205 to be blown down into the valley 380 of the kicker wheel 125, while the trailing edge of the article 110 is supported substantially across its width by the thin product support rail 305. This can prevent the trailing edge of the article 110 from bending or cupping and enables the tab 205 to properly fold over the trailing edge.

Figure 4C:
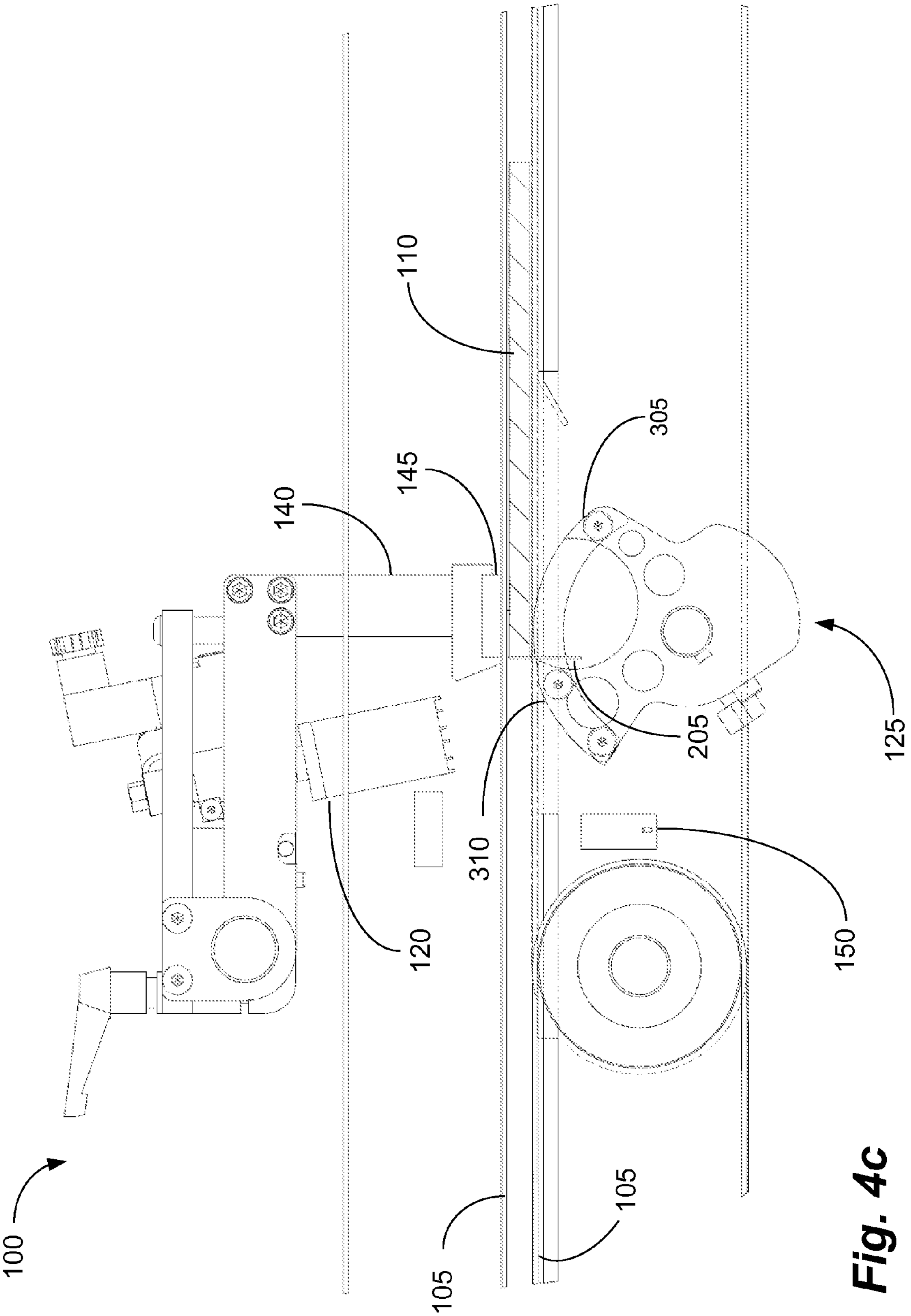
Figure 4D:
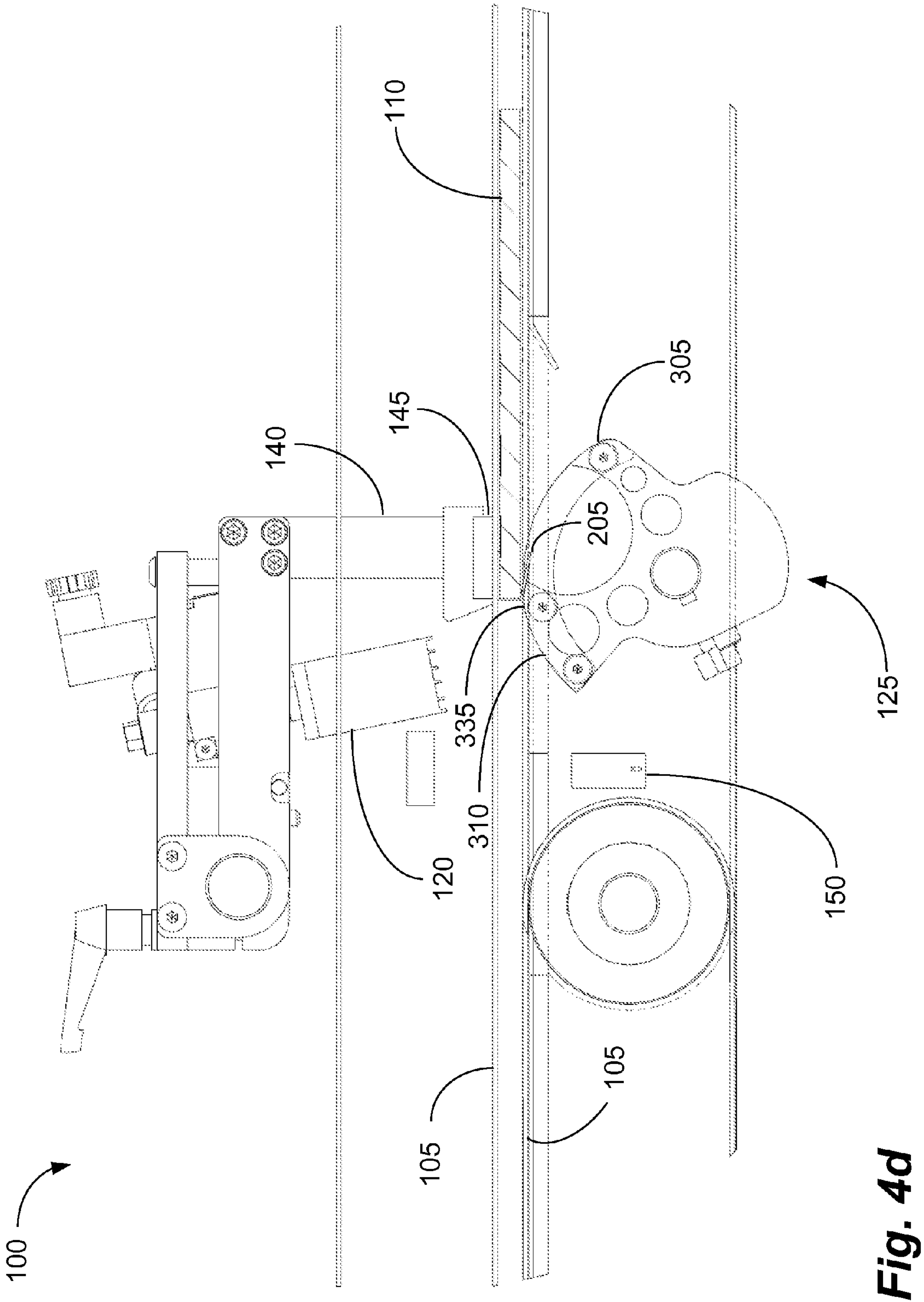

In FIGS. 4*c*-4*d*, the leading edge of the profiled tab swipe 310 is rotated until it “crashes” into the tab 205. Because the kicker wheel 125 is traveling significantly faster than the belts 105, the profiled tab swipe 310 is able to fold the tab 205 under the trailing edge of the article 110, though the article 110 traveling away from the kicker wheel 125. The tab 205 can be folded under the article 110 and adhered to the bottom side of the article 110.

Figure 4E:
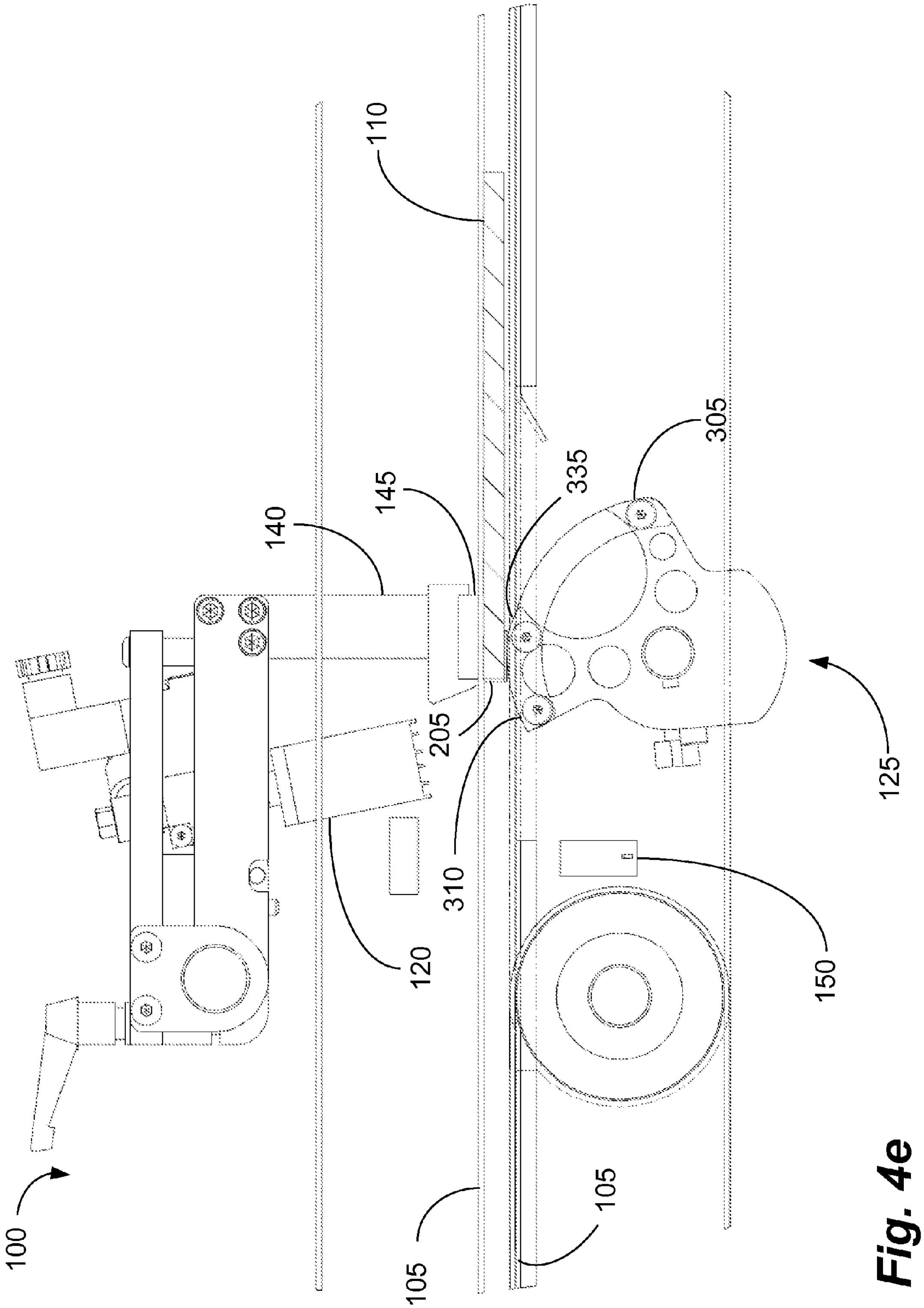

In FIG. 4*e*, the protrusion 335 on the profiled tab swipe 310 can lift the article 110 up slightly. At this time, the article 110 can be briefly trapped between the protrusion 335 and the brake pad 145. The brake arm 140 is spring-loaded and thus exerts a downward force against the protrusion 335. This enables the protrusion 335 to firmly press the tab 205 onto the bottom of the article 110. Because the article 110 is temporarily stopped at this time, the belts 105 can be designed to slip over the article 110 without damaging it.

Figure 4F:
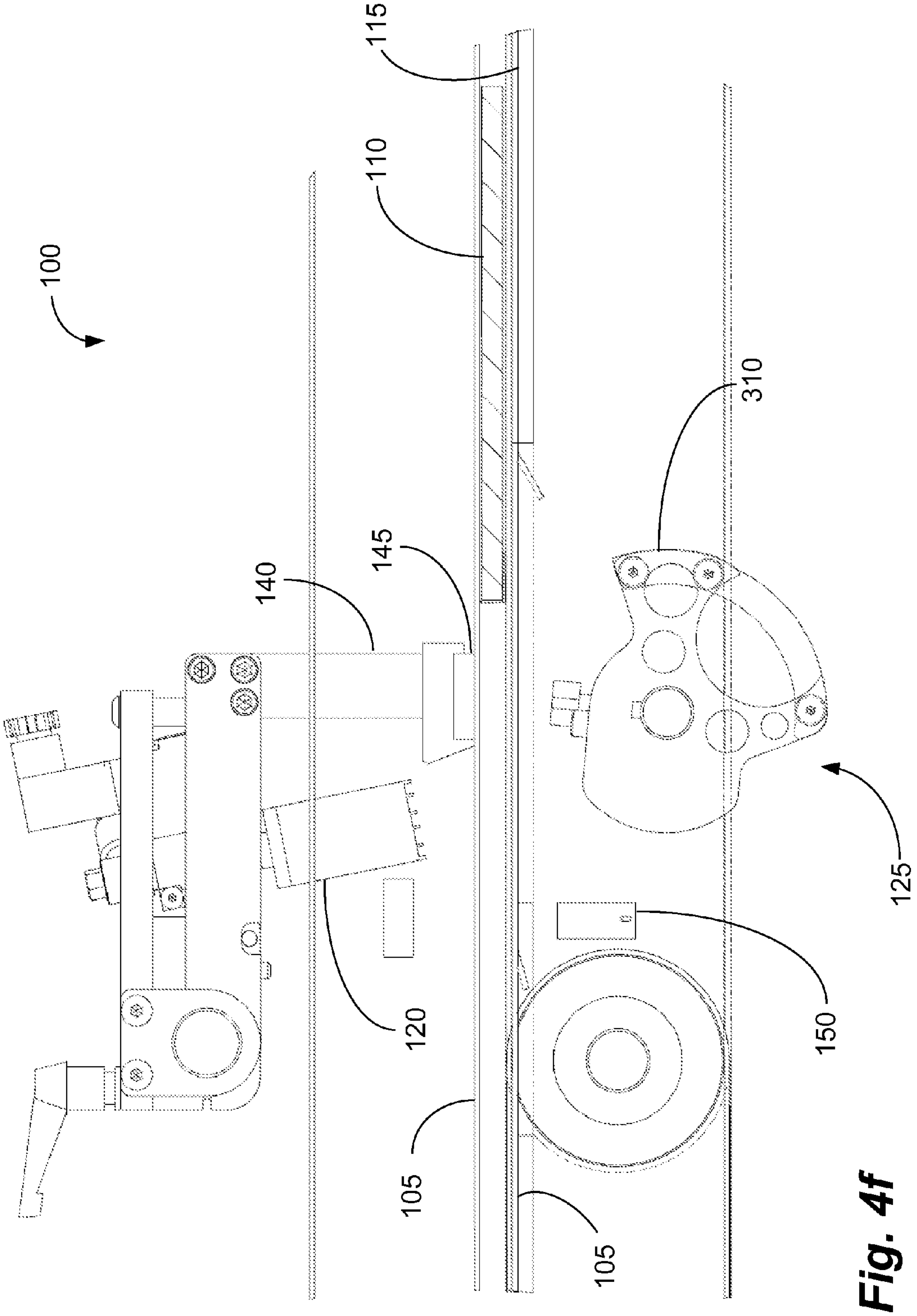

As shown in FIG. 4*f*, the kicker wheel 125 then returns to its park position, clear of the belts 105 and the article 110. This releases the article and enables it to continue down the table 115 for collection or further processing, for example. When the profiled tab swipe 310 is rotated away from the brake pad 145, the brake arm 140 can also return to its rest position under spring pressure.

In some embodiments, a single, wide kicker wheel 125 can be used to fold multiple trailing edge tabs 205. In other embodiments, multiple kicker wheels 125 can be used to fold multiple trailing edge tabs 205 (e.g., one kicker wheel 125 per tab). In still other embodiments, the kicker wheel 125 can comprise multiple sets of kicker rails 315 disposed along the width of the kicker wheel 125 to fold multiple tabs with one kicker wheel 125 (e.g., at least one kicker rail 315 disposed on either side of each tab 205).

In some embodiments, the kicker wheel 125 can be used in conjunction with conventional techniques to apply tabs 205 to all four sides of an article 110 if desired. In other words, tabs 205 can be placed on all four sides of the article 110. As the article 110 travels down the table 115, the tabs 205 on the leading edge can be crash folded, the tabs on the sides can be side apply folded, and the tabs in the trailing edge can be folded and sealed using one or more kicker wheels 125.

The spring-loaded brake arm 140 can be adjusted such that, in the rest position, the space between the brake pad 145 and the table is slightly greater than the thickness of the article 110. In other words, the brake pad 145 does not contact or stop the article 110 unless the kicker wheel 125 is activated. In this manner, applying trailing edge tabs can be optional. In other words, the kicker wheel 125 servo can be deactivated and the tabber 100 can perform as a conventional leading edge/side edge tabber with no interference from the kicker wheel 125 or the brake pad 145.

In a preferred embodiment, the kicker wheel 125 can be CNC machined from Nylatron. Embodiments of the present invention, however, are not so limited. For example, the kicker wheel could be machined from steel or could me molded from a suitably strong plastic. The kicker wheel could also be cast from a variety of metals, including but not limited to, steel, brass, bronze, and pot metal. The kicker wheel 125 could also be constructed from a variety of composite materials, such as for example, fiberglass and carbon fiber.

While several possible embodiments are disclosed above, embodiments of the present invention are not so limited. For instance, while several possible configurations of materials for the kicker wheel have been disclosed, other suitable materials and combinations of materials could be selected without departing from the spirit of embodiments of the invention. In addition, the location and configuration used for various features of embodiments of the present invention can be varied according to a particular tabbing machine or article size that requires a slight variation due to, for example, the size or construction of the tabbing machine, space requirements, or article size and material. Such changes are intended to be embraced within the scope of the invention.

The specific configurations, choice of materials, and the size and shape of various elements can be varied according to particular design specifications or constraints requiring a device, system, or method constructed according to the principles of the invention. Such changes are intended to be embraced within the scope of the invention. The presently disclosed embodiments, therefore, are considered in all respects to be illustrative and not restrictive. The scope of the invention is indicated by the appended claims, rather than the foregoing description, and all changes that come within the meaning and range of equivalents thereof are intended to be embraced therein.

The invention claimed is:

1. A kicker wheel useful, in combination with a tab sealing machine, to apply one or more tabs to the trailing edge of a passing article comprising:

a thin product support rail, disposed on a leading edge of the kicker wheel, for supporting the trailing edge of the article as it passes over the kicker wheel;

a profiled tab swipe, disposed on a trailing edge of the kicker wheel, for folding the one or more tabs under the article and lifting the trailing edge of the article as is passes over the kicker wheel;

a first, arcuate kicker rail, detachably secured to a first side of the thin product support rail and a first side of the profiled tab swipe, for supporting a first side of the article as it passes over the kicker wheel; and a second, arcuate kicker rail, detachably secured to a second side of the thin product support rail and a second side of the profiled tab swipe, for supporting a second side of the article as it passes over the kicker wheel;

wherein the kicker wheel is rotatable about an axis;

wherein the first and second kicker rails and the thin product support rail are disposed on a common arcuate path about the axis; and wherein at least a portion of the profiled tab swipe lies outside the common arcuate path.

2. The kicker wheel of claim 1, wherein the kicker wheel is not weight balanced about the axis.

3. The kicker wheel of claim 1, further comprising:

a counterweight disposed such that the kicker wheel is balanced about the axis.

4. The kicker wheel of claim 1, further comprising:

an axle hole sized and shaped to slide over an axle;

a set screw for clamping the kicker wheel to the axle; and a set screw stop disposed proximate the set screw;

wherein the set screw stop enables the set screw to be partially loosened to enable the kicker wheel to be repositioned on, but not removed from, the axle; and wherein the set screw stop must be removed from the kicker wheel to completely remove the set screw.

5. The kicker wheel of claim 4, wherein the axle is a keyed axle; and the axle hole is sized and shaped to slide over the keyed axle.

6. The kicker wheel of claim 4, wherein the kicker wheel is rotatable about a central axis;

the common arcuate path is a common circular path; and the axle is a central axle.

7. A kicker wheel useful, in combination with a tab sealing machine, to apply one or more tabs to the trailing edge of a passing article comprising:

a first portion comprising:

a profiled tab swipe, disposed on a trailing edge of the first portion, for folding the one or more tabs under the article, and comprising a projection for lifting the trailing edge of the article as is passes over the kicker wheel;

a thin product support rail, disposed on a leading edge of the first portion, for supporting the trailing edge of the article as it passes over the kicker wheel;

a valley, defined between the profiled tab swipe and the thin product support rail, to enable the one or more tabs to deflect as the article passes over the valley; and one or more arcuate kicker rails, disposed between the thin product support rail and the profiled tab swipe, for supporting at least a first side of the article as it passes over the valley; and a second portion comprising a counterweight disposed opposite the first portion to adjust the balance of the kicker wheel;

wherein the kicker wheel is rotatable about an axis;

wherein the one or more kicker rails, a portion of the profiled tab swipe, and the thin product support rail are disposed on a common arcuate path about the axis; and wherein the projection lies outside the common arcuate path.

8. The kicker wheel of claim 7, wherein the counterweight adjusts the weight of the kicker wheel such that the first portion and the second portion are balanced about the axis.

9. The kicker wheel of claim 7, wherein the counterweight adjusts the weight of the kicker wheel such that the first portion and the second portion are unbalanced about the axis.

10. The kicker wheel of claim 7, wherein the one or more kicker rails are detachably coupled to the kicker wheel with a plurality of fasteners.

11. The kicker wheel of claim 7, wherein the one or more kicker rails are integrally formed with the kicker wheel.

12. The kicker wheel of claim 7, wherein the first portion of the kicker wheel further comprises one or more lightening holes.

13. The kicker wheel of claim 7, wherein the first portion and the second portion form a kicker wheel with a substantially circular profile.

14. The kicker wheel of claim 7, wherein the one or more kicker rails, a portion of the profiled tab swipe, and the thin product support rail lie in a first arcuate path; and the second portion lies in a second arcuate path; and wherein the second arcuate paths lies inside the first arcuate path.

15. The kicker wheel of claim 14, wherein the projection lies in a third arcuate path; and the third arcuate path lies outside the first arcuate path.

* * * * *